US006436452B1

(12) United States Patent
Deutz et al.

(10) Patent No.: US 6,436,452 B1
(45) Date of Patent: Aug. 20, 2002

(54) TOMATO PRODUCTS WITH INCREASED FRUITY FLAVOR

(75) Inventors: Inge Elisabeth Deutz, Vlaardingen (NL); Patrick Joseph Dunphy; Hendrikus Theodorus van der Hijden, both of Sharnbrook (GB)

(73) Assignee: Lipton, division of Concopo, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/387,458

(22) Filed: Sep. 1, 1999

(30) Foreign Application Priority Data

Sep. 2, 1998 (EP) .............................. 98307040

(51) Int. Cl.⁷ .......................... A23B 7/155; A23L 1/222
(52) U.S. Cl. ......................... 426/52; 426/615
(58) Field of Search .............................. 426/49, 51, 52, 426/534, 536, 541, 650, 615, 638, 545, 589, 599

(56) References Cited

U.S. PATENT DOCUMENTS

| 3,826,851 A | | 7/1974 | Guadagni et al. |
| 4,978,549 A | | 12/1990 | Norihisa et al. |
| 5,705,372 A | | 1/1998 | Belin et al. |
| 5,922,374 A | | 7/1999 | Daury et al. |
| 6,113,955 A | * | 9/2000 | Deutz et al. ................... 426/49 |
| 6,150,145 A | * | 11/2000 | Hausler et al. .............. 435/147 |

FOREIGN PATENT DOCUMENTS

| DE | 36 03 359 | 7/1987 |
| FR | 2 731 321 | 9/1996 |

OTHER PUBLICATIONS

Abstract of Special Publications of the Royal Society of Chemistry, "The co–oxidation of carotenoids by lipoxygenase in tomatoes", pp. 32–37 (1996), vol. 197.

Sciences Des Aliments, "Partial Purification, Some Properties and in Vitro Cooxidation of Some Carotenoid Pigments", 11, (1991) pp. 277–290.

J. Agric Food Chem, Quantitative and Sensory Studies on Tomato Paste Volatiles, Buttery et al., 1990, 38 pp. 336–340.

Biotechnology for Improved Foods and Flavors, Carotenoid–Derived Aroma Compounds: Biogenetic and Biotechnological Aspects, Chapter 28, date N.A.

* cited by examiner

*Primary Examiner*—Keith Hendricks
(74) *Attorney, Agent, or Firm*—Gerard J. McGowan, Jr.

(57) ABSTRACT

The invention relates to processing tomatoes into paste, sauce or related products, in which the processed products have an improved flavour. More in particular, the processed products have increased amounts of fruity flavour compounds. This is achieved by co-oxidation of carotenoids and polyunsaturated fatty acids, using an enzyme having lipoxygenase activity.

10 Claims, No Drawings

TOMATO PRODUCTS WITH INCREASED FRUITY FLAVOR

FIELD OF THE INVENTION

The present invention relates to processing tomatoes into paste, sauce or related products, in which the processed products have an improved flavour. More in particular, the processed products have increased amounts of fruity flavour compounds.

BACKGROUND OF THE INVENTION

Processing tomatoes to prepare tomato paste, pasta sauce, etcetera usually involves comminuting tomatoes, heating to inactivate cell-wall degrading enzymes, such as polygalacturonase (PG) and pectin methyl esterase (PME), and heating to remove water (by evaporation) to obtain the desired thickness. The cutting operation and further processing (heating) liberates and induces generation of flavour and aroma compounds. If one plots a graph of the development of flavour intensity over time, (roughly speaking) three peaks can be distinguished, although the bases of the curves overlap with each other.

Early in processing a mixture of predominantly "green" flavours develops, of which the intensity gradually builds to a peak, whereafter the "green" flavours gradually disappear, as they are volatile and heating is effected in the processing. Said heating starts the formation of "burnt" flavour notes, which also builds to a peak in intensity during the processing, albeit usually lower and broader, depending on e.g. processing conditions. In between these two peaks a third peak of "fruity" flavours (also sometimes referred to as "cooked tomato" flavours) can be distinguished, although in most processing operations its peak of intensity is much lower than the "green" and "burnt" flavours, which are still/already present.

Hence, processing tomatoes on an industrial scale leads to a flavour development over time in which the intensity of the desired "fruity" (and/or "cooked tomato") flavours is usually very much dominated by "green" and/or "burnt" notes that are present.

An important "fruity" flavour in the above (which is generated in tomatoes) is known to be β-ionone. Similar known in this respect is β-cyclocitral. R. G. Buttery et al report in J. Agric. Food Chem. Vol. 38(1), pp. 336–340 (1990) that β-ionone is present in fresh tomatoes and in tomato paste in concentrations of about 4 and 2 (0–4) ppb, respectively. Similarly, it is reported that β-cyclocitral is present in fresh tomatoes and in tomato paste in concentrations of about 3 and 3 (2–6) ppb, respectively.

U.S. Pat. No. 5,705,372 discloses the preparation of flavour compounds by an enzymic process, in which a source having lipoxygenase and hydroperoxide lyase activity is contacted with unsaturated fatty acids and carotene. The resulting flavour mixture comprises both C6–C10-aldehydes and ionones.

In Sciences Des Aliments, 11, 277–290 (1991) it is disclosed by M Cabibel and J. Nicolas that isolated lipoxygenase from tomato origin can oxidise pigments like β-carotene, when in the presence of linoleate.

It is reported by C. L. Allen and J. W. Gramshaw in "Special Publications of the Royal Society of Chemistry" Vol. 197, 32–37 (1996) that lipoxygenase isolated from tomato fruit can catalyse the oxidation of linoleic acid in the presence of β-carotene. The major co-oxidation products are reported to be β-ionone, β-cyclocitral, and 5,6-epoxy-β-ionone.

P. Winterhalter (Biotechnology for Improved Foods and Flavours, chapter 28: Carotenoid-Derived Aroma Compounds: Biogenic and Biotechnological Aspects) discloses that lipoxygenase can co-oxidise polyunsaturated compounds and polyene compounds. The polyene compounds can be (derived from) natural sources rich in carotenoids, such as palm oil or plant extracts (e.g. carrots).

U.S. Pat. No. 3,826,851 discloses that the flavor of processed tomato products can be improved by the addition of a mixture composed of cis-3-hexenal, 2-methylhept-2-en-6-one, eugenol, and β-ionone.

SUMMARY OF THE INVENTION

It is an object of the present invention to provide a process for preparing a processed tomato product, which tomato product should have an enhanced "fruity" flavour (flavour is to be understood herein to include aroma next to taste), when compared to conventional processing. Said process should preferably involve minimal changes in conventional tomato processing to provide a processed tomato product (e.g. paste, pasta, passata, salsa, sauce, dices, pulp etcetera). Any changes in processing involving the addition of specific components should preferably be such that the added components are food grade and/or are of tomato-origin. It is a further object of the present invention to provide a processed tomato product having an enhanced "fruity" flavour.

It has been found that the above objectives can be achieved by a process for preparing a tomato product, the process comprising at least the steps of:

comminuting tomatoes, adding a source providing solubilised or soluble carotenoids adding a source providing poly-unsaturated fatty acids, incubating the above mixture for at least 10 minutes.

In this process, the tomatoes before being incubated should preferably treated such that not all endogenous enzymes are being inactivated.

Alternatively, such a product may be obtained by a process for preparing a tomato product, the process comprising at least the steps of:

comminuting tomatoes, solubilising carotenoids present in said tomatoes, adding a source providing poly-unsaturated fatty acids, adding an enzyme preparation having lipoxygenase (EC 1.13.11.12) activity, incubating the above mixture for at least 10 minutes.

It was found that the above processes, which rely on the same principle, provide a processed tomato product having a concentration of β-ionone of at least 10 ppb (parts-per-billion).

Likewise, to further improve the fruity flavour of the processed tomato product, it is preferred to provide a processed tomato product having a concentration of β-cyclocitral of at least 10 ppb (parts-per-billion). The above can be achieved by the same processes as disclosed above.

The term "processed" is herein to be understood as to refer to any product obtained by comminuting fresh tomatoes, but preferably not (sun-)dried tomatoes.

In the above, it is in particular preferred if the processed tomato product is a tomato pasta, tomato passata, tomato salsa, tomato ketchup, pulped tomato, diced tomato, tomato juice, tomato soup, etcetera.

In the processes as disclosed above, polyunsaturated fatty acids (PUFA's) may be added as such or in the form of triglycerides of PUFA's. Considering the latter case, most PUFA-triglyceride sources such as olive oil contain a considerable amount of free fatty acids, among which are free PUFA's. When adding triglycerides, it is also possible to liberate the PUFA's therefrom, provided that in the latter case an enzyme having lipolytic activity is present or is added.

In the first process as described above, one source providing both carotenoids and poly-unsaturated fatty acids may be used to provide both components partly or fully. An example of such a source is vegetable oil rich in carotenoids, such as olive or or palm oil.

Although two processes are set out above, the essence of the invention can be seen in the following process:

comminuting tomatoes, adding a source providing poly-unsaturated fatty acids, ensuring solubilised or soluble carotenoids are present ensuring an enzyme having lipoxygenase (EC 1.13.11.12) activity is present incubating the above mixture for at least 10 minutes. Some of the compounds (e.g. the enzyme or carotenoids) can be present by nature in tomatoes, and is it a mere "making them available" (carotenoids) or activation (enzyme).

DETAILED DESCRIPTION OF THE INVENTION

To further improve the fruity flavour of the processed tomato product, it is preferred to provide a processed tomato product having a concentration of β-ionone of at least 30 ppb (parts-per-billion). More preferably the concentration of β-ionone is at least 100 ppb.

Depending upon the source and intended product, it may be preferred to have processed tomato products which are both high in β-ionone and β-cyclocitral, in concentrations as above. Preferred concentrations for β-cyclocitral are at least 20 ppb, preferably at least 100 ppb.

Although no real upper limits for the presence of the fruity components as β-ionone and β-cyclocitral exist, this will usually be less than 1000 ppm for each of these components, but usually less, although this depends on the product concenrned (e.g. concentrated tomato paste vs tomato juice).

Although the processes as set out above may provide other valuable (carotenoid derived) fruity flavours in addition to β-ionone and β-cyclocitral, these two components (and in particular β-ionone) are chosen as yardstick and are very characteristic of fruity and/or cooked flavours.

For example, under similar conditions linear terpenoids can be co-oxidised by lipoxygenase in the presence of PUFA's to form other compounds contributing to the overall fruity flavour, e.g. geranyl acetone.

Although two alternative processes are set out above, the 10 present invention also covers combinations of the two processes, provided that:

an enzyme having lipoxygenase activity is present

β-carotene is present in a soluble/solubilised form a polyunsaturated fatty acid is present or can be generated in-situ (e.g. from triglycerides and a lipolytic enzyme). Intermediate forms of both processes (e.g. both adding an enzyme as well as activating the lipoxygenase already present) are also covered by the present invention.

The carotenoids play an important role in the co-oxidation process as presently claimed. Although most tomato varieties contain carotenoids in a sufficient amount, most of it is believed to be located in the form of crystalline regions in chromoplasts, which is a form unsuitable to play a role in the co-oxidation. Hence, in order to provide sufficient available carotenoids it is necessary that carotenoids already present are solubilised, are added in already soluble or solubilised form, or both. Solubilisation (e.g. in a hydrophobic phase) can be achieved by techniques known in the art involving a surfactant or emulsifier, where appropriate.

In the process for obtaining the above products, it is preferred that the incubation is carried out at a pH of between 3 and 7. More preferably the incubation is carried out at a pH of between 4 and 6.8. Most preferred is to effect the incubation at a pH the comminuted tomato already has (e.g. 4–5 or 4–4.5). This avoids the use of acidifiers or alkali.

In view of the optimum of the enzyme having lipoxygenase activity, it is preferred that the incubation is carried out at a temperature of 10–90° C., preferably 50–80° C. conveniently, such temperatures are quite similar to the temperatures applied in normal processing (cold break).

Best results (in terms of desired flavour formation) can be achieved if lipoxygenase is allowed to perform, whilst hydroperoxide lyase activity (of which some is usually present in tomatoes) is kept low, preferably as low as possible. As hydroperoxide lysase is inactivated at a much lower temperature than lipoxygenase (difference about 25–30° C.), hydroperoxide lyse can be inactivated by heating (e.g. to 50° C. for 15 minutes). By doing so, the amount of C6–C10 aldehydes formed is minimal, and it is these compounds which can dominate the fruity flavour with their "green" character.

In actual processing tomatoes the processes as set out above can be carried out at various stages of processing, e.g:

after comminuting but before the actual hot- or cold-break process (and by ensuring the substrate and co-substrate are present)

in the processed tomato product, by adding an enzyme having lipoxygenase activity (and by ensuring the substrate and co-substrate are present).

Also, it is possible to have the processing carried out split stream. One stream in which fruity flavours such as β-ionone and β-cyclocitral are generated according to the present invention, and one stream of tomatoes which is subjected to normal tomato processing, such as the conventional hot- or cold-break process. The two streams may then later be mixed, the first to provide the fruity flavour, the second providing the bulk and/or body of the processed tomato product.

The invention is further exemplified by the following examples, which are to be understood as to be non-limiting.

EXAMPLES

Materials carotene (type II C4582, Sigma)

linoleic acid (L8134 Sigma)

Soybean lipoxygenase type 1 (62340 Fluka)

McIlvain buffer pH 6.8

Seppak-Silica cartridge (Waters 51900)

DynaGard filter 0.45 μm

HPLC HP 1090M system actar 77454, PC 66514

RM 6 cryostat 12.0° C.

column: 2*250 mm Chromsphere PAH with internal diameter 4.6 mm.

Preparation of β-Carotene Stock

A stock of 1.4 mM β-carotene with 3% Triton X-100 was prepared by adding 0.75 mg 0-carotene and 30 mg Triton X-100 to 1 ml McIlvain buffer and 1 ml dicholoromethane. The dichloromethane was evaporated under a nitrogen stream while intensively stirred.

Preparation of Tomato Pulp

Tomatoes were obtained from the local supermarket and were mixed with an oxygen-saturated McIlvaine buffer (1:1 w/v) and subsequently mixed for 30 seconds in a Waring blender (level 7). The pH was adjusted by addition of concentrated NaOH to 6.8 or left at the endogenous (tomato) pH (4.3)

Extraction Method for β-Ionone

β-Ionone is extracted from 30 ml tomato homogenate with 10 ml pentane in a 50 ml Falcon tube. After mixing on a vortex the mixture was shaken for 5 minutes. After centrifugation (15 minutes, 1500 g) the organic (pentane) phase was removed and added to a clean Falcon tube of 50 ml. The water phase was again extracted in the same way with further 10 ml pentane, and the two solutions were pooled and dried with anhydrous sodium sulphate. The dried pentane layer was concentrated on a Seppak-Silica cartridge. The cartridge was eluted with 5 ml (pentane/t-butyl-methyl ether, 2:1). The first ml was discarded, the next 4 ml were collected and slowly evaporated with nitrogen gas until dryness. The remaining β-ionone was suspended in 200 $\mu$l hexane. After filtration on a DynaGard filter the samples were injected on the HPLC and the amount of β-ionone was measured, by comparison with a freshly prepared reference solution of β-ionone.

Biogenesis of β-Ionone in a Tomato Pulp

β-ionone formation was determined in a tomato pulp at pH 6.8, containing 0.4% Triton X-100, after addition of linoleic acid, β-carotene and lipoxygenase, according to the scheme as set out in Table 1. Reaction (incubation) was carried out at a temperature of about 20° C. for 60 minutes. Linoleic acid and β-carotene were added in final concentration of 1 mM and 0.14 mM, respectively. Soybean lipoxygenase was added at 20 $U/_9$ tomato pulp. The effect of inactivation of the endogenous tomato lipoxygenase activity was investigated by heat-treating the tomato pulp to inactivate the enzyme present by microwave heating for 25 seconds at 700 W. The results are listed in table 1.

TABLE 1

Effect of added substrate, co-substrate and enzyme.

| Sample | substrate and/or enzyme added | β-ionone formed (ppb) |
|---|---|---|
| tomato pulp | none | <1 |
| tomato pulp | linoleic acid | <1 |
| tomato pulp | β-carotene | <1 |
| tomato pulp | linoleic acid + β-carotene | 42 |
| tomato pulp | soybean LOX | <1 |
| tomato pulp | linoleic acid + β-carotene + soybean LOX | 113 |
| heat-treated tomato pulp | linoleic acid + β-carotene | <1 |
| heat-treated tomato pulp | linoleic acid + β-carotene + soybean LOX | 46 |

It can be seen that β-ionone formation only increased when both substrates (β-carotene and linoleic acid) are present. Addition of soybean lipoxygenase (soybean LOX) resulted in an increase of β-ionone, as compared to the homogenate that contains only the endogenous tomato lipoxygenase. When the tomato lipoxygenase was inactivated using heat treatment, the soybean lipoxygenase produced a similar amount of β-ionone as the tomato LOX in an untreated pulp. It must be noted that soybean LOX was added at a much higher activity than the activity being present as a result of endogenous tomato LOX being present. In this tomato about 0.1–0.2 U/g (1 U=1 micromol lipid peroxide formed per minute) LOX activity appeared to be present and soy LOX is added at 50–100 fold higher activity.

Influence of Concentrations of β-Carotene and Linoleic Acid on β-Ionone Formation The β-ionone formation was determined at different concentrations of β-carotene and linoleic acid, for a system as in the fourth example in table 1 (tomato LOX, B-carotene, linoleic acid). Linoleic acid was added in concentrations of 0–1.5 mM, at a fixed β-carotene level of 0.14 mM. Conditions were otherwise as in previous example. The results are set out in table 2.

TABLE 2

Effect of concentration of linoleic acid.

| concentration linoleic acid (mM) | concentration β-carotene (mM) | β-ionone formed (ppb) |
|---|---|---|
| 0 | 0.14 | 0 |
| 0.0938 | 0.14 | 12.9 |
| 0.1875 | 0.14 | 17.2 |
| 0.375 | 0.14 | 20.6 |
| 0.75 | 0.14 | 24.2 |
| 1.5 | 0.14 | 29.4 |

The β-carotene was added at concentrations of 0–0.28 mM at a fixed level of 0.75 mM linoleic acid. The results are set out in table 3.

TABLE 3

Effect of concentration of β-carotene.

| concentration linoleic acid (mM) | concentration β-carotene (mM) | β-ionone formed (ppb) |
|---|---|---|
| 0.75 | 0 | 0 |
| 0.75 | 0.0175 | 4.3 |
| 0.75 | 0.035 | 4 |
| 0.75 | 0.07 | 14.9 |
| 0.75 | 0.14 | 19.4 |
| 0.75 | 0.28 | 44.9 |

Influence of Temperature and pH During Formation of β-Ionone

The influence of reaction time and temperature was determined for the system as set out in table 4. Remaining conditions were the same as in the examples of table 1. The system contained tomato pulp, β-carotene (0.14 mM), and linoleic acid (1.0 mM). The pH was adjusted by use of NaOH/HCl solutions.

TABLE 4 influence of temperature and pH

| sample | pH | Temp. (° C.) | β-ionone formed (ppb) |
|---|---|---|---|
| tomato pulp | 6.8 | 20 | <1 |
| tomato pulp, β-carotene, linoleic acid | 6.8 | 20 | 48 |
| tomato pulp, β-carotene, linoleic acid | 6.8 | 50 | 78 |
| tomato pulp | 4.3 | 20 | <1 |
| tomato pulp, β-carotene, linoleic acid | 4.3 | 20 | 69 |

TABLE 4-continued influence of temperature and pH

| sample | pH | Temp. (° C.) | β-ionone formed (ppb) |
|---|---|---|---|
| tomato pulp, β-carotene, linoleic acid | 4.3 | 50 | 189 |
| tomato pulp, β-carotene, linoleic acid | 3.0 | 20 | 58 |
| tomato pulp, β-carotene, linoleic acid | 3.5 | 20 | 102 |
| tomato pulp, β-carotene, linoleic acid | 4.0 | 20 | 126 |
| tomato pulp, β-carotene, linoleic acid | 4.5 | 20 | 112 |
| tomato pulp, β-carotene, linoleic acid | 5.0 | 20 | 92 |
| tomato pulp, β-carotene, linoleic acid | 7.0 | 20 | 56 |

Influence of Reaction Time on Formation of β-Ionone

The formation of β-ionone was measured as a function of reaction time, ranging from 0–160 minutes. The system contained tomato pulp, β-carotene (0.14 mM), and linoleic acid (1.0 mM) as in the earlier examples. Temperature was 50° C., incubations were done at both pH 4.3 and 6.8.

TABLE 5

Effect of reaction time at pH 4.3 and pH 6.8

| pH | reaction time (min) | β-ionone formed (ppb) |
|---|---|---|
| 6.8 | 0 | 0 |
| 6.8 | 5 | 32 |
| 6.8 | 10 | 34.2 |
| 6.8 | 20 | 38.3 |
| 6.8 | 40 | 33.1 |
| 6.8 | 160 | 56.8 |
| 4.3 | 0 | 0 |
| 4.3 | 5 | 38.3 |
| 4.3 | 10 | 54.6 |
| 4.3 | 20 | 80.8 |
| 4.3 | 80 | 105.7 |
| 4.3 | 160 | 137.2 |

Biogenesis of β-Ionone and β-Cyclocitral in a Tomato Pulp by Added Soybean Lipoxygenase The formation of β-ionone and β-cyclocitral in tomato pulp by combined action of endogenous tomato lipoxygenase and added soybean lipoxygenase has been determined. Linoleic acid was added to the tomato pulp in an amount of 200 nmol/g tomato pulp, β-carotene (20 µg/g tomato pulp) was added dissolved in MCT oil (25 mg/g tomato pulp) to which gum arabic (25 mg/g tomato) was added. The reaction mixture was incubated for 90 minutes at 20° C. at pH 6.8, both with and without added soybean lipoxygenase (0.044 U/g tomato pulp). No inactivation prior to addition of enzyme has been carried out, so endogenous tomato lipoxygenase may have been active in both samples. Analysis was carried out using dynamic headspace analysis method, similar as is described in PCT/EP98/03172. The volatiles were collected by a purge and trap technique with a Tekmar trapping system and Tenax as absorbing material. The volatiles are then thermally desorbed, cryofocussed and analysed using GC-FID. 2-methylcyclohexanon is used as internal standard. The results are set out in table 6.

TABLE 6

Biogenesis of β-ionone and β-cyclocitral in a tomato pulp

| enzyme added | β-ionone formed (ppb) | β-cyclocitral formed (ppb) |
|---|---|---|
| no enzyme added | 0 | 4 |
| soybean lipoxygenase | 38 | 14 |

Biogenesis of β-Ionone and β-Cyclocitral in a Tomato Pulp by Endogenous Tomato Lipoxygenase The formation of β-ionone and β-cyclocitral in tomato pulp by endogenous tomato lipoxygenase has been determined. Linoleic acid was added to the tomato pulp in an amount of 200 nmol/g tomato pulp, β-carotene (concentration 0 or 300 µM) was added dissolved in MCT oil (100 mg/g tomato pulp) to which gum arabic (100 mg/g tomato) was added. The reaction mixture was incubated for 90 minutes at 20° C. at pH 6.8. No inactivation prior to addition of enzyme has been carried out, so formation of β-ionone and β-cyclocitral were due to endogenous tomato lipoxygenase activity. Analysis was carried out as example above. The results are set out in table 7.

TABLE 7

Biogenesis of β-ionone and β-cyclocitral in a tomato pulp by endogenous tomato lipoxygenase

| concentration β-carotene (µM) | β-ionone formed (ppb) | β-cyclocitral formed (ppb) |
|---|---|---|
| 0 | 1 | 0 |
| 300 | 17 | 13 |

What is claimed is:

1. A processed tomato product of enhanced fruity flavor as compared to tomato products prepared by comminuting tomatoes, heating to inactivate cell wall-degrading enzymes and heating to remove water, said processed tomato product having a concentration of β-cyclocitral of at least 10 parts-per-billion, wherein the processed tomato product is not a dried tomato.

2. The processed tomato product according to claim 1, having a concentration of β-cyclocitral of at least 20 ppb.

3. The processed tomato product according to claim 2, having a concentration of β-cyclocitral of at least 100 ppb.

4. The processed tomato product according to claim 1, additionally having a concentration of β-ionone of at least 10 ppb.

5. The processed tomato product according to claim 4, having a concentration of β-ionone of at least 100 ppb.

6. The processed tomato product according to claim 1, wherein the product is selected from the group consisting of: tomato paste, tomato passata, tomato salsa, tomato ketchup, pulped tomato, diced tomato, tomato juice, tomato soup and mixtures thereof.

7. A process for preparing a tomato product of enhanced fruity flavor as compared to tomato products prepared by comminuting tomatoes heating to inactivate cell wall-degrading enzymes and heating to remove water, the process comprising:

comminuting tomatoes, said tomatoes not be dried tomatoes, solubilizing carotenoids present in said tomatoes, adding poly-unsaturated fatty acids or a source thereof containing poly-unsaturated fatty acids, adding an enzyme preparation having lipoxygenase activity, incubating the above mixture for at least 10 minutes to produce said tomato product.

8. The process according to claim 7, wherein incubation is carried out at a pH of between 3 and 7.

9. The process according to claim 7, wherein the incubation is carried out at a temperature of 10–90° C.

10. The process according to claim 7, wherein the source providing poly-unsaturated fatty acids comprises olive oil or palm oil.

* * * * *